United States Patent
Müller Graf

(10) Patent No.: US 12,026,141 B2
(45) Date of Patent: *Jul. 2, 2024

(54) DATA STORAGE SYSTEM CONFLICT MANAGEMENT

(71) Applicant: Adobe Inc., San Jose, CA (US)

(72) Inventor: Thomas Müller Graf, Langenthal (CH)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/169,733

(22) Filed: Feb. 15, 2023

(65) Prior Publication Data

US 2023/0195709 A1  Jun. 22, 2023

Related U.S. Application Data

(63) Continuation of application No. 17/339,188, filed on Jun. 4, 2021, now Pat. No. 11,609,894.

(51) Int. Cl.
| | |
|---|---|
| *G06F 16/00* | (2019.01) |
| *G06F 16/215* | (2019.01) |
| *G06F 16/22* | (2019.01) |
| *G06F 16/23* | (2019.01) |
| *G06F 16/2455* | (2019.01) |

(52) U.S. Cl.
CPC ........ *G06F 16/2255* (2019.01); *G06F 16/215* (2019.01); *G06F 16/2358* (2019.01); *G06F 16/2365* (2019.01); *G06F 16/24553* (2019.01)

(58) Field of Classification Search
None
See application file for complete search history.

(56) References Cited

U.S. PATENT DOCUMENTS

| | | | |
|---|---|---|---|
| 11,609,894 B2 | 3/2023 | Müller Graf | |
| 11,860,837 B2 * | 1/2024 | Borsos | G06F 16/44 |
| 2006/0184490 A1 | 8/2006 | Heim et al. | |
| 2016/0373944 A1 * | 12/2016 | Jain | H04M 3/2236 |
| 2022/0046089 A1 | 2/2022 | Adams | |
| 2022/0391369 A1 | 12/2022 | Müller Graf | |

FOREIGN PATENT DOCUMENTS

CA  2460318 C  5/2013

OTHER PUBLICATIONS

U.S. Appl. No. 17/339,188, "Non-Final Office Action", U.S. Appl. No. 17/339,188, filed Oct. 26, 2022, 6 pages.
U.S. Appl. No. 17/339,188, "Notice of Allowance", U.S. Appl. No. 17/339,188, filed Dec. 7, 2022, 11 pages.

* cited by examiner

*Primary Examiner* — Bai D Vu
(74) *Attorney, Agent, or Firm* — FIG. 1 Patents

(57) ABSTRACT

Data storage system conflict management techniques are described. In one example, data is sent by client devices to both a repository system and a search index system of a data storage system. Each of the client devices maintains, locally, records of changes to data of the repository system, e.g., through use of an invertible Bloom lookup table. The records are used as a basis by the client devices to send reports to an arbiter system and used to detect conflicts When detected, a conflict request is communicated to client devices involved in the conflict as well as to the repository system and responses used to generate a correction that is communicated to update the repository system and search index system.

20 Claims, 7 Drawing Sheets

DATA STORAGE SYSTEM CONFLICT MANAGEMENT

RELATED APPLICATION

This application is a continuation of and claims priority to U.S. patent application Ser. No. 17/339,188, filed Jun. 4, 2021, entitled "Data Storage System Conflict Management", the entire disclosure of which is hereby incorporated by reference herein in its entirety.

BACKGROUND

Data storage is one of the primary underlying functionalities used to support an ever-increasing range of computing device operations. At an enterprise level, data storage is used to support cloud services, storage related to a particular enterprise, and so on. In one such example, data storage is implemented as a "single source of truth" for an enterprise. As such, integrity of and access to this data is of paramount importance in the operation of the enterprise.

Conventional techniques and systems, however, have encountered significant challenges in maintaining accuracy of the data while at the same time reducing latency in accessing the data. In a search scenario, for instance, a repository system is typically implemented to store data and a search index system is implemented to maintain a search index to support search of the data maintained by the repository system. Conventional techniques result in delays in the update of the search index as changes are first made to the repository system and then to the search index system. Because of this, the changes are not searchable until to update is applied to the index. This challenge is compounded due to the multitude of client devices that access the repository system, conflicts caused between client devices by updates to the same entries in the repository system, and so forth.

As such, conventional techniques hinder operation of the repository system and devices that implement the system. This is due to the high overhead to the repository system involved in updates to both the system itself which are then used to update search index as well as delays in an ability to perform an accurate search due to an out-of-date search index.

SUMMARY

Data storage system conflict management techniques are described that reduce network bandwidth, processor use, and memory access with low latency and fast convergence. In one example, data is sent by client devices to both a repository system and a search index system of a data storage system. This conserves resources of the repository system and decreases latency over conventional techniques that rely on communication through a repository system to a search index system. Each of the client devices maintains, locally, records of changes to data of the repository system, e.g., through use of an invertible Bloom lookup table. The records are used as a basis by the client devices to send reports to an arbiter system that is tasked with maintaining data integrity of the data storage system.

The arbiter system uses the reports to detect conflicts. When detected, conflict request is communicated to client devices involved in the conflict as well as to the repository system. The conflict request identifies an amount of data and which records are to be communicated to the arbiter system as response data to resolve the conflict. In response, the arbiter system receives response data and from this, generates a correction for the conflict that is communicated to update the search index system.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
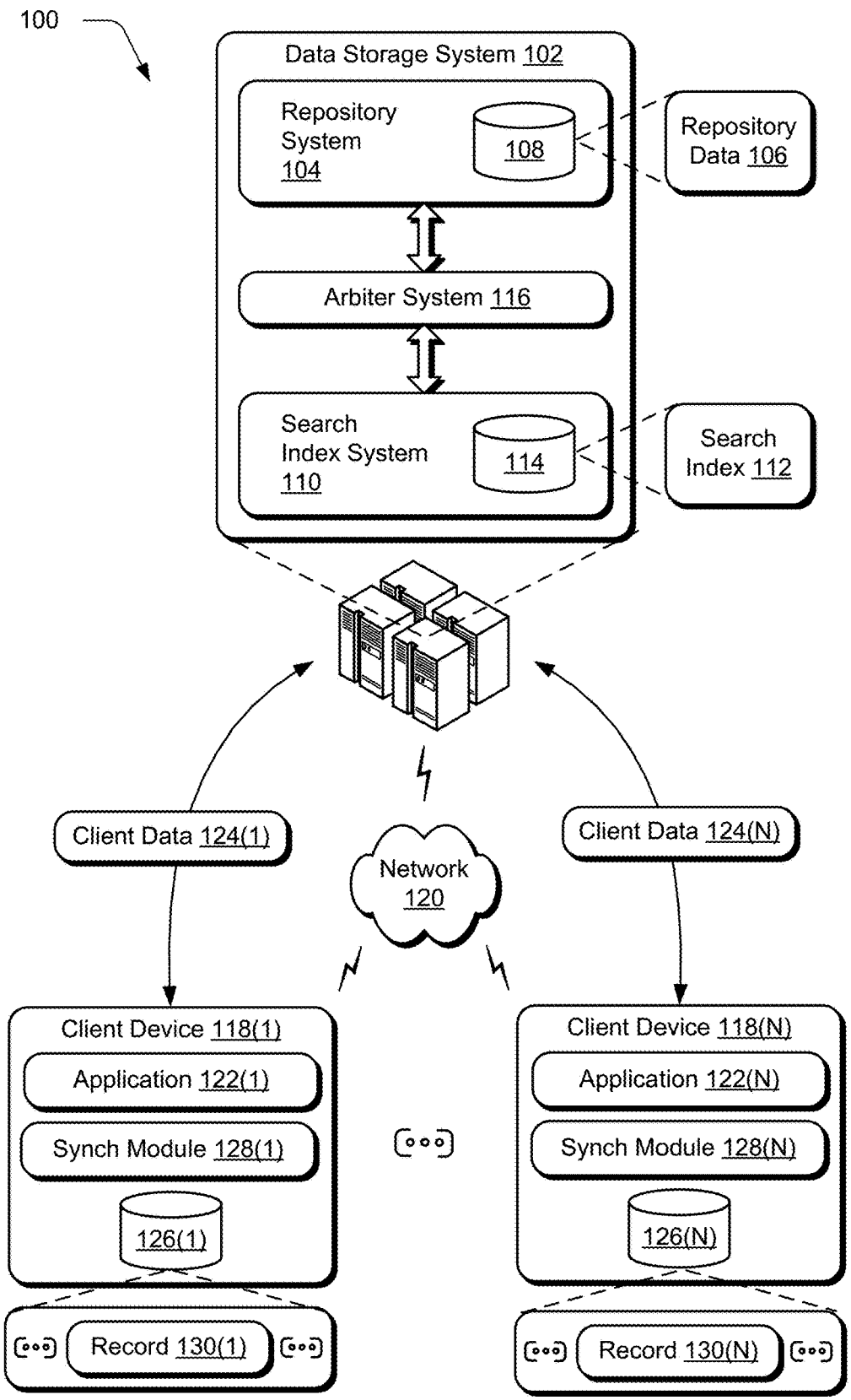
FIG. 1 is an illustration of a digital medium environment in an example implementation that is operable to employ data storage conflict management techniques described herein.

Data storage is one of the primary underlying functionalities used to support an ever-increasing range of computing device operations. Accordingly, accuracy and accessibility of this data has a direct effect on these operations. However, conventional techniques involve significant amounts of overhead and introduce latency in data storage, such as in conventional two-phase commit and three-phase commit protocols that involve significant amounts of computational resource usage.

Accordingly, data storage system conflict management techniques are described that overcome conventional challenges and reduce network bandwidth, processor use, and memory access with low latency and fast convergence. In one example, the techniques involve a data storage system having a repository system (e.g., a database) and a search index system. The repository system is configured to maintain data (also referred to as "repository data" in the following) that is received from client devices, and more particularly applications executed in an application tier by the client devices. A search index system is also included as part of the data storage system that maintains a search index for use in locating repository data of interest, i.e., particular items. The search index may contain a copy of certain data, e.g. excerpts.

Each of the client devices in this example transmits client data to both the repository system and the search index system. An arbiter system is then tasked with detecting conflicts between the client devices as well as maintaining consistency between the repository system and the search index system. In this way, the search index is not updated via the repository system and as such reduces delay and computational resource consumption and network bandwidth of the repository system. In some instances, updates to the search index are implemented before updates to the repository system thereby further reducing delays in accessing the data maintained by the repository system.

Each of the client devices maintains, locally, records of changes to data of the repository system. In one instance, in order to reduce memory storage consumption, the records are maintained using hashes, e.g., a hash of a key and a hash of a corresponding value of a respective record. An example of a data structure used to maintain these records is an Invertible Bloom Lookup Table (IBLT). Invertible Bloom lookup tables are a hash-based data structure that supports insertion, deletion, and listing of inserted items (e.g., records) while consuming a minimal amount of memory resources. This data structure is configured for set reconciliation problems, which form a basis for conflict resolution in the following discussion. Invertible Bloom lookup tables include algorithms and an arrangement of cells to store key/value pairs. Each cell typically has a count of how many pairs are mapped to the cell, the exclusive-or sum of the keys mapped to it, the exclusive-or sum of values mapped to it, and a checksum per cell.

The client devices are configured to communicate reports to the arbiter system that describe respective changes initiated to the repository data of the repository system, e.g., changes that are initiated by respective applications of respective client devices. The reports are based on the hash of the key, and optionally the hash of the corresponding value of respective records that are changed. The list of hashes may also be compressed, e.g., through configuration as a Golomb-coded sequence.

In an implementation, an amount of data included in the reports from respective hashes is set by the arbiter system. The arbiter system, for instance, may determine the amount of data based on a number of active client devices, heuristic data describing past conflicts, a probability of encountering a conflict, and so on. This amount is then communicated by the arbiter system to the client devices, which is used to control an amount of data taken from respective hashes for inclusion in reports communicated to the arbiter system, e.g., a number of bits taken from the hash. In this way, the amount of resources involved in communicating the reports over a network and processing the reports by the arbiter system is reduced, thereby improving operation of these devices.

The arbiter system is configured to detect conflicts by comparing the reports (and more particularly the hashes or partial hashes), one to another. In an instance in which a possible conflict is detected (e.g., multiple clients updated the same keys, in which case the hashes of the keys would be the same), the arbiter system identifies which client devices are involved in the conflict. The arbiter system also, in an implementation, determines an amount of data to be requested. This amount specifies an amount of data from the hashes as described above, e.g., based on a number of active client devices, heuristic data describing past conflicts, a probability of encountering a conflict, and so on. The arbiter system also identifies which records are to be included, e.g., based on which records are involved in the conflict which may also include records before/after the conflict. This information is communicated as a conflict request to the identified client devices as well as to the repository system.

In response, the arbiter system receives response data that includes the keys and values that the clients updated, stored in an invertible Bloom lookup table. The repository system also generates such a data structure that contains the keys and values of the requested records using similar techniques as those described for the client device above. From this, the arbiter system tries to generate a correction for the conflict by comparing the responses, e.g., by merging data included in the responses using an XOR operation. If the expected size of the conflicts was chosen too small, then the arbiter will request more data from the clients and the repository, until it can generate a correction. This correction is then transmitted by the arbiter system to correct the repository data of the repository system and/or to correct the search index of the search index system. The correction may also be communicated to the client devices to correct data maintained locally by those devices. In this way, the conflict management techniques described herein support concurrent changes (e.g., writes) to the repository system and search index system without locking or coordination and thus reduces an number of operations involved in maintaining the data. Additionally, these techniques overcome conventional challenges to reduce network bandwidth, processor use, and memory access with low latency and fast convergence. Further discussion of these and other examples is included in the following sections and shown using corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Digital Medium Data Conflict Resolution Environment

FIG. 1 is an illustration of a digital medium environment 100 in an example implementation that is operable to employ data storage conflict management techniques described herein. The illustrated environment 100 includes a data storage system 102 and a plurality of client devices that are implemented using respective computing devices. The computing devices are configurable in a variety of ways.

A computing device, for instance, is configurable as a desktop computer, a laptop computer, a mobile device (e.g., assuming a handheld configuration such as a tablet or mobile phone), and so forth. Thus, a computing device ranges from full resource devices with substantial memory and processor resources (e.g., personal computers, game consoles) to a low-resource device with limited memory and/or processing resources (e.g., mobile devices). Additionally, a computing device is also representative of a plurality of different devices, such as multiple servers utilized by a business to perform operations "over the cloud" as illustrated for the data storage system 102 and as further described in relation to FIG. 7.

The data storage system 102 includes a repository system 104 that is configured to maintain repository data 106 in a storage device 108. The repository data 106, for instance, is maintained as a relational or non-relational database and acts as a storage tier in the digital medium environment 100. A search index system 110 is also included that maintains a search index 112 in a storage device 114, which may be the same as or different from storage device 108. The search index system 110 maintains the search index 112 to support a search of the repository data 106, e.g., through use of a full-text index, regular index, and so forth.

The arbiter system 116 of the data storage system 102 is configured ensure consistency of the search index 112 with the repository data 106. The arbiter system 116 is also configured to resolve conflicts involving the repository data 106. This includes conflicts between data communicated by respective client devices 118(1)-118(N), data communicated by a respective one of the client devices 118(1)-118(N) and that maintained as repository data 106, the repository data 106 and the search index 112, and so forth. In an implementation, the arbiter system 116 is implemented independent (e.g., using separate computing devices) from the repository system 104 and/or search index system 110 such that computational resources consumed by the arbiter system 116 do not affect these other systems.

In the illustrated example, the client devices 118(1)-118(N) are communicatively coupled to the data storage system 102 via a network 120, e.g., the Internet. The client devices 118(1)-118(N) execute respective applications 122(1)-122(N) as implementing an application tier in the digital medium environment 100 that read and/or write client data 124(1)-124(N) to the data storage system 102 from storage devices 126(1)-126(N) maintained locally at the client devices 118(1)-118(N). In an implementation, the client data 124(1)-124(N) is written to both the repository system 104 and the search index system 110 by respective client devices 118(1)-118(N) as further described in relation to FIG. 2.

The client devices 118(1)-118(N) include synch modules 128(1)-128(N) that are representative of functionality to assist the arbiter system 116 in maintaining data consistency and resolving data conflicts in the data storage system 102. The synch modules 128(1)-128(N) may be implemented separately as illustrated, incorporated as part of the applications 122(1)-122(N), and so forth.

The synch modules 128(1)-128(N) are configured to maintain records 130(1)-130(N) locally at the client device 118(1)-118(N) (or elsewhere by a third-party system accessible via the network 120) that describe changes to the repository data 106 initiated using respective client data 124(1)-124(N). These records 130(1)-130(N) are usable as a basis to detect and resolve data conflicts by the arbiter system 116, even without communicating with the repository system 104 or search index system 110. This improves operational efficiency of devices that implement these entities as further described in the following section and shown using corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Data Storage System Conflict Management

Figure 2:
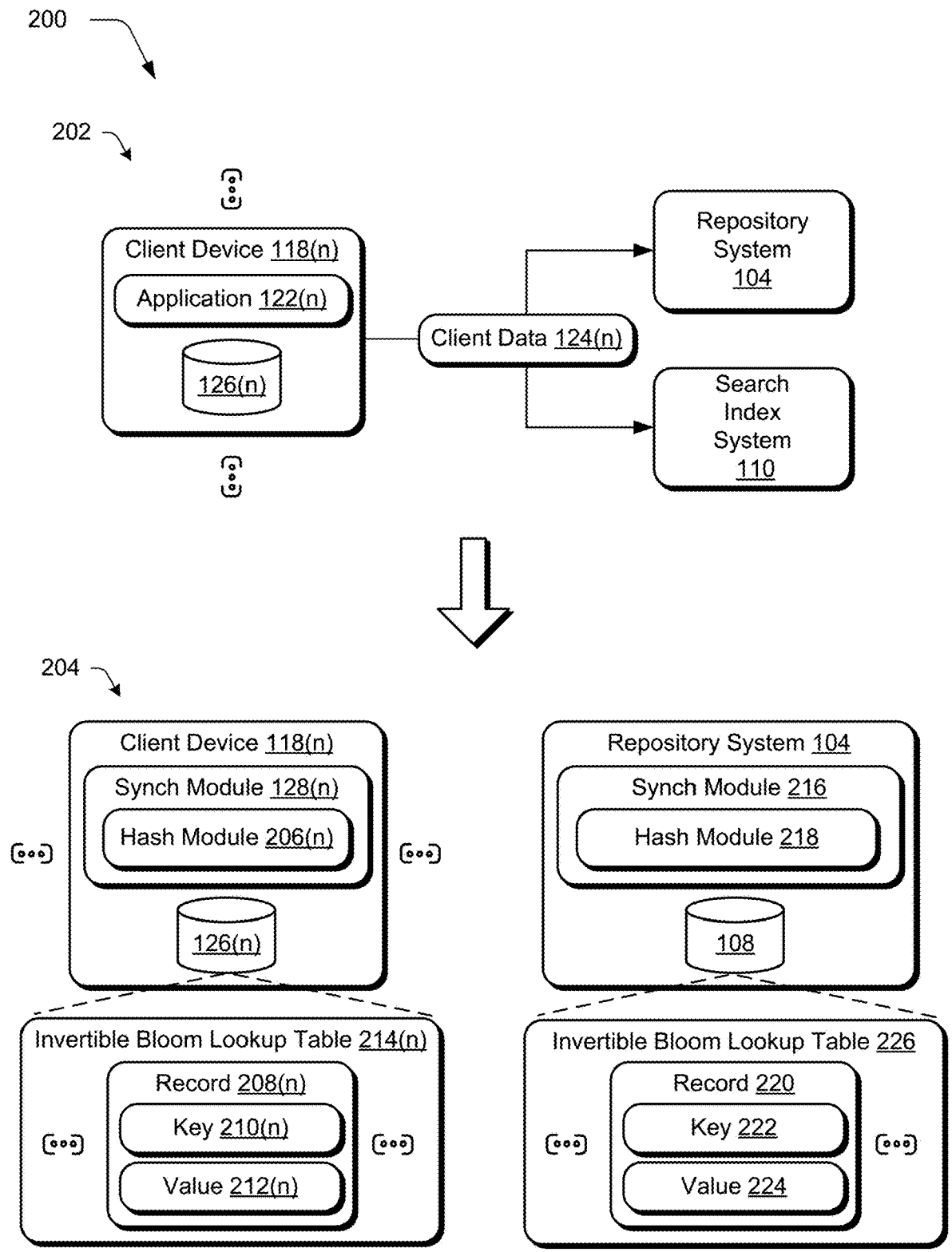
FIG. 2 depicts a system in an example implementation showing communication of client data from a client device to both a repository system and a search index system and generating of record of the communication.
Figure 3:
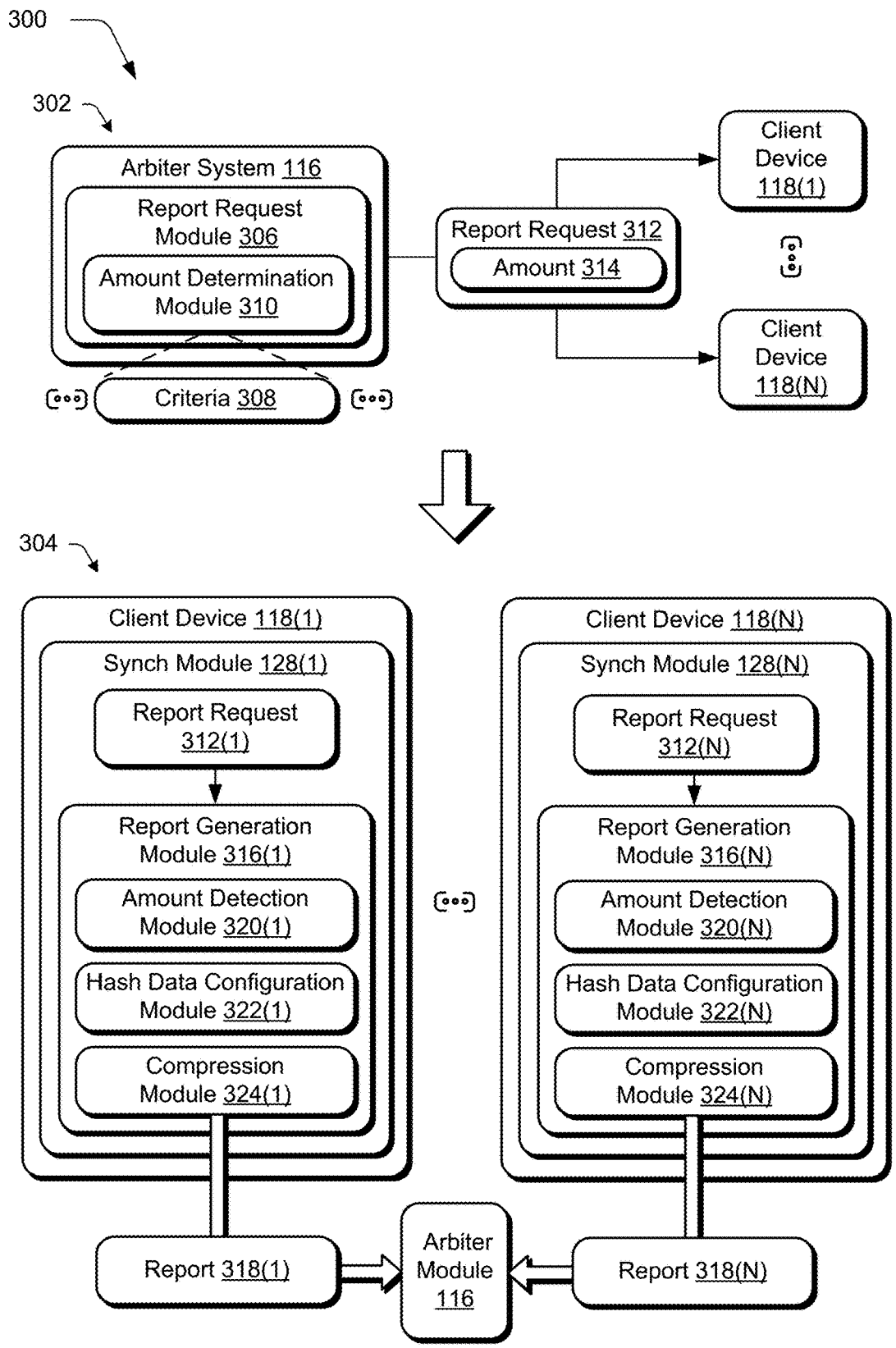
FIG. 3 depicts a system in an example implementation showing generation of a report request by an arbiter system and generation of a report responsive to the request by a plurality of client devices.
Figure 4:
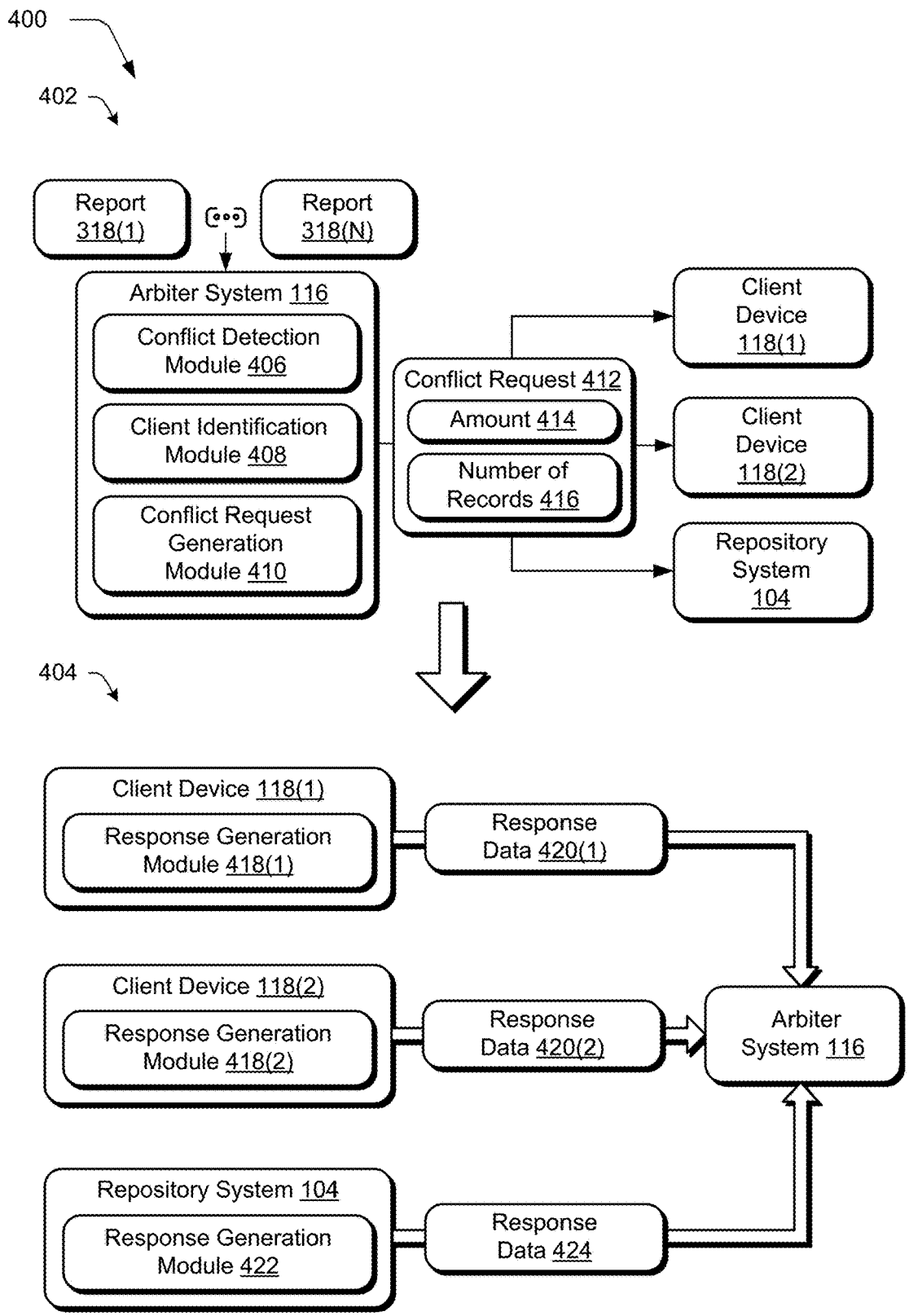
FIG. 4 depicts a system in an example implementation of detecting a conflict using the reports of FIG. 3, generation of a conflict request, and receiving response data.
Figure 5:
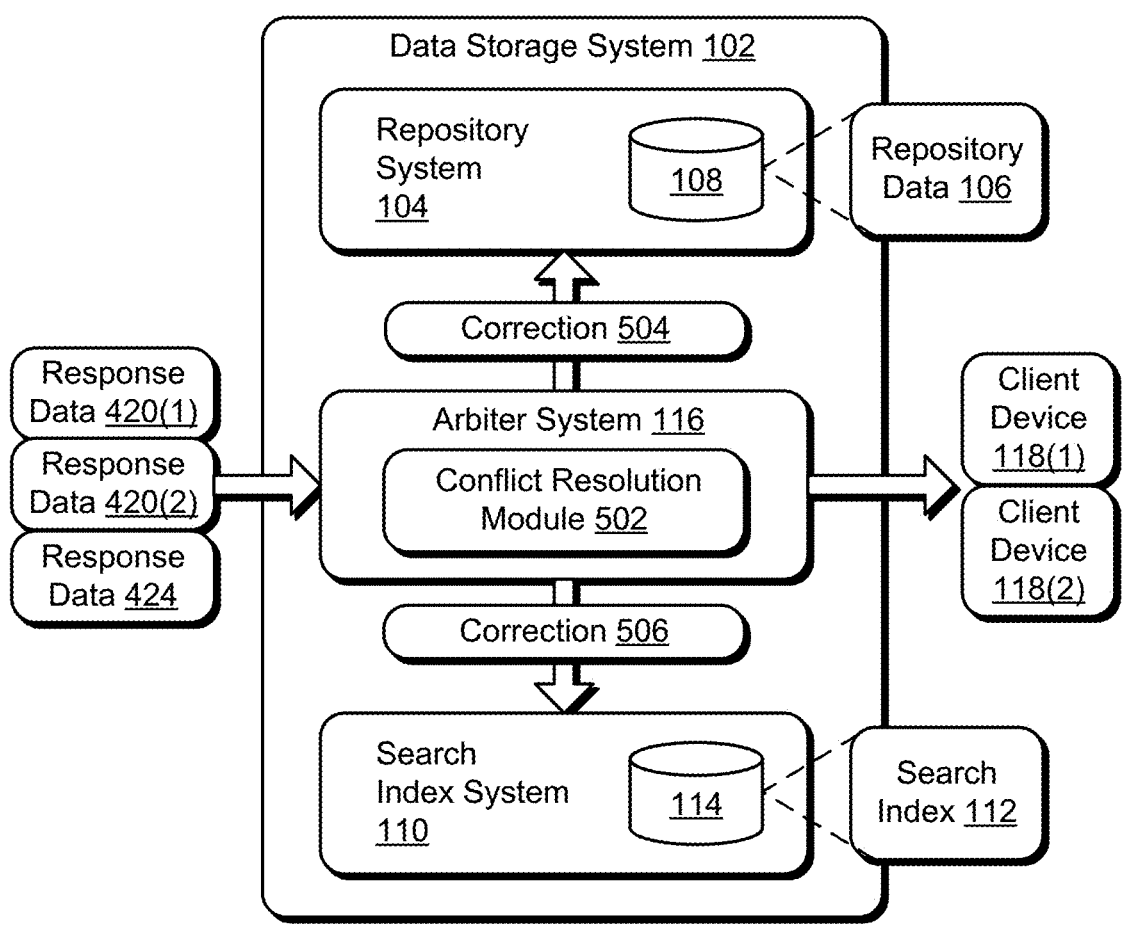
FIG. 5 depicts a system in an example implementation of generating a correction to resolve the conflict, the correction transmitted to the search index system of the data storage system.
Figure 6:
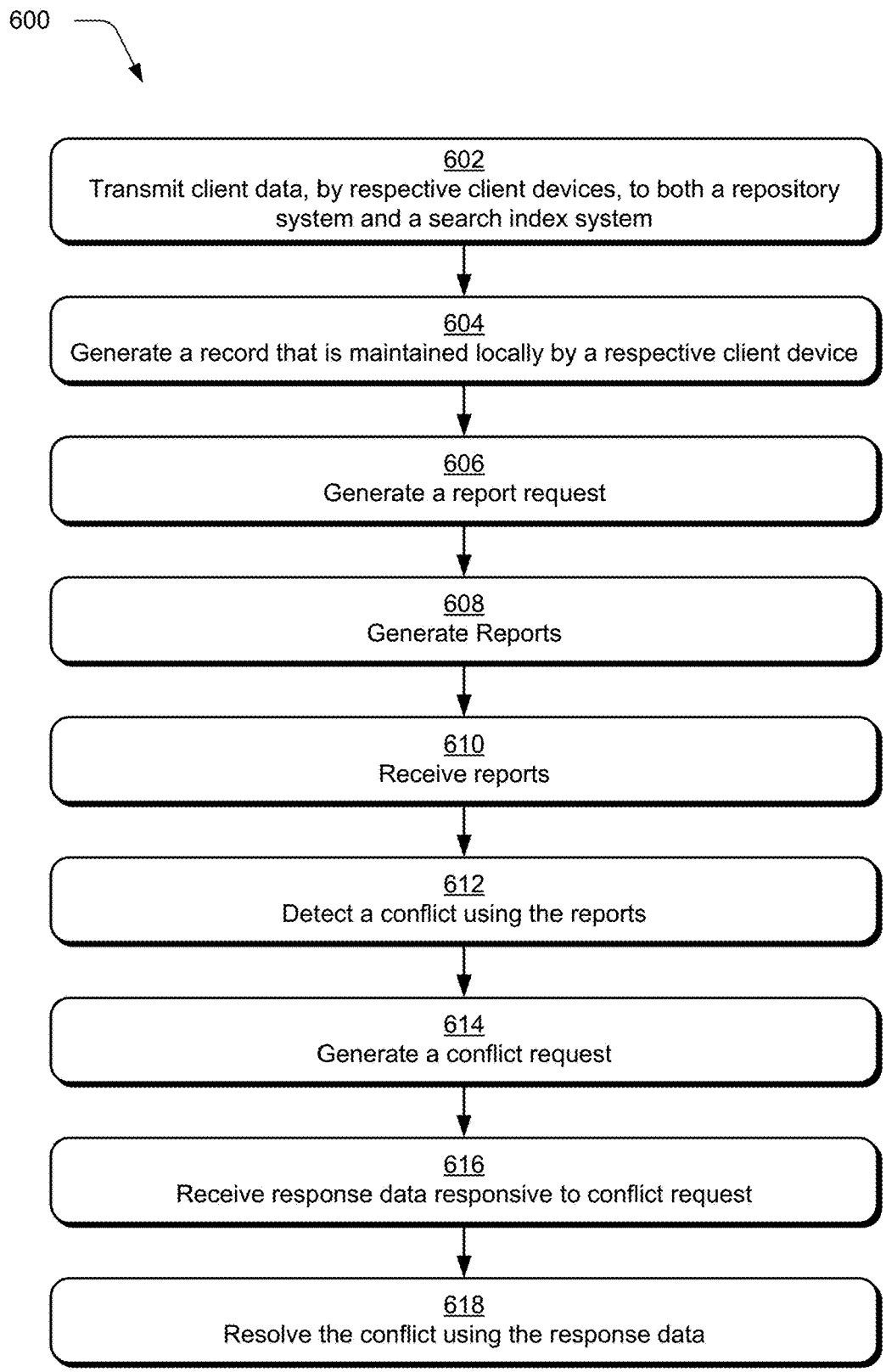
FIG. 6 is a flow diagram depicting a procedure in an example implementation of data conflict resolution.

FIG. 2 depicts a system 200 in an example implementation showing communication of client data from a client device to both a repository system and search index system and generating of record of the communication. FIG. 3 depicts a system 300 in an example implementation showing generation of a report request by an arbiter system and generation of a report responsive to the request by a plurality of client devices. FIG. 4 depicts a system 400 in an example implementation of detecting a conflict using the reports of FIG. 3, generation of a conflict request, and receiving response data. FIG. 5 depicts a system 500 in an example implementation of generating a correction to resolve the conflict, the correction transmitted to the repository system and the search index system of the data storage system. FIG. 6 depicts a procedure 600 in an example implementation of data conflict resolution.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6.

To begin in this example, client data is transmitted, by respective client devices, to both a repository system and a search index system (block 602). As illustrated at a first stage 202 of FIG. 2, an application 122(n) is executed by a client device 118(n), which is representative of any one of the client devices 118(1)-118(N) of FIG. 1.

Execution of the application 122(n) generates client data 124(n), which is maintained in a storage device 126(n), for receipt by a repository system 104 and the search index system 110. The repository system 104, for instance, acts as a "single source of truth" for enterprise data. By communicating the client data 124(n) to both systems directly, computational resource consumption of the repository system 104 is reduced by not requiring the repository system 104 to then communicate the client data 124(n) to the search index system 110 as is involved in conventional techniques. Further, this communication is performable without locking or coordination between the client devices 118(1)-118(N) and corresponding systems through use of the arbiter system 116 which is used to maintain data consistency and resolve conflicts.

A record is then generated by the respective client device 118(n) that is maintained locally by the device. The record describes changes to the repository data initiated by the respective client device (block 604). As shown at a second stage 204 of FIG. 2, the synch module 128(n) of the client device 118(n) includes a hash module 206(n). The hash module 206(n) is configured to generate a record 208(n) describing each change (e.g., a write) initiated by the client device 118(n) to the repository data 106 of the repository system 104 and the search index system 110. The record 208(n), for instance, may be maintained in volatile or non-volatile memory, e.g., as a file, implemented by the storage device 126(n).

The record 208(n) is configurable in a variety of ways. In the illustrated example, the record 208(n) includes a key 210(n) to identify the change and a value 212(n) that describes a value that is changed. A variety of techniques are usable to maintain the records 208(n) in the storage device 126(n). In one example, an invertible Bloom look table 214(n) is employed. An invertible Bloom lookup table 214(n) is a hash-based data structure that supports insertion, deletion, and listing of records 208(n) (keys 210(n) and values 212(n)) while consuming a minimal amount of memory resources of the storage device 126(n). This data structure is configured for set reconciliation problems, which form a basis for conflict resolution.

Invertible Bloom lookup tables 214(n) include algorithms and an arrangement of cells to store key/value pairs. Each cell has a count of how many pairs are mapped to the cell, the sum of the keys mapped to it, and a sum of values mapped to it. In an implementation, the size (i.e., memory utilization) of this data structure is a large as a size expected to be involved in data conflicts, and not the number of entries. Thus, a size of the invertible Bloom lookup table 214(n) may be even smaller that a list of keys. The size, for instance, may be based on heuristics which identify a size of past conflicts experienced by the repository system 104, detected by the arbiter system 116, and so on.

In the illustrated example at the second stage 204 of FIG. 2, the repository system 104 also includes a synch module 216 and hash module 218 to maintain records 220 of changes using a key hash 222 and a value hash 224. The records 220 are also maintained using an invertible Bloom lookup table 226 in the storage device 108 for use in resolving conflicts as further described below.

The arbiter system 116 then generates a report request (block 606) as shown at a first stage 302 of FIG. 3. A report request module 306, for instance, examines one or more criteria 308 using amount determination module 310 to generate the report request 312 to specify an amount 314 of data to be included in a report received by the arbiter system 116.

In an example, the amount determination module 310 determines the amount 314 of data based on a number of active client devices, heuristic data describing past conflicts, a probability of encountering a conflict, and so on. This amount 314 is then communicated by the arbiter system 116 to the client devices 118(1)-118(N) and may also be communicated to the repository system 104. This is used to control an amount of data taken from respective hashes for inclusion in reports communicated to the arbiter system, e.g., a number of bits taken from the hash. Other examples are also contemplated, such as to employ set amounts by the client devices 118(1)-118(N) and repository system 104 for communication of the hashes or partial hashes from the records.

Reports are then generated (block 608) by the client devices 118(1)-118(N). Report generation is initiated in a variety of ways, such as at set times, upon initiation of a threshold amount of changes (e.g., writes), responsive to receipt of the report request 312, and so on. As shown at a second stage 304 of FIG. 3, report requests 312(1)-312(N) received by respective client devices 118(1)-118(N) are employed by respective report generation modules 316(1)-316(N) to generate respective reports 318(1)-318(N), which are communicated to the arbiter system 116.

To do so, an amount detection module 320(1)-320(N) determines the amount 314 specified in the report requests 312(1)-312(N). The amount 314, for instance specifies a number of bits to be taken from respective key hashes 210(n) and/or value hashes 212(n) of respective records 208(n) maintained locally by the client devices 118(n). Hash data configuration modules 322(1)-322(N) are then employed to generate partial hashes in this instance by taking a specified amount of bits from the respective hashes, e.g., a top sixteen bits per record. The partial hashes are then compressed using a respective compression module 324(1)-324(N) (e.g., as a Golomb-coded sequence). This is included in the reports 318(1)-318(N) communicated to the arbiter system 116. Similar techniques are also usable by the synch module 216 of the repository system 104 to generate reports.

The reports 318(1)-318(N) are received by the arbiter system 116 (block 610) from the client devices 118(1)-118(N) (and the repository system 104 in another example) as shown at a first stage 402 of FIG. 4. The arbiter system 116 then uses the reports 318(1)-318(N) to detect a conflict (block 612) using a conflict detection module 406. A conflict, for instance, may be detected by comparing partial hashes of the values for corresponding hash keys included in the reports 318(1)-318(N). In one example, the conflict is detected solely from reports received from the client devices 118(1)-118(N) and does not use a report from the repository system. In another example, the conflict is detected using a report received from the repository system 104.

When a conflict is detected, a client identification module 408 is employed to identify which client devices of the plurality of client devices are involved in the conflict. Client devices 118(1), 118(2), for instance, both initiate a change to the same entry in the repository data 106 as indicated by respective reports, but disagree as to a value for that value. Therefore, at least one client device is identified that includes a conflicting value based on reports sent by those devices.

A conflict request generation module 410 of the arbiter system 116 then generates a conflict request 412 (block 614). Like the report request, the conflict request 412 specifies an amount of respective hashes (e.g., for the key 210(n) and/or the value 212(n)) that are to be included in response data. The amount 414 of data is based on a variety of criteria, including a number of active client devices, heuristic data describing past conflicts, a probability of encountering a conflict, and so on. A number of records 416 is also computed that are to be obtained from the devices, e.g., based on the key values which may also include an additional number of records positioned before and/or after the conflicting records in a sequence of changes initiated by respective client devices. The conflict request 412 including the amount 414 and the number of records 416 is communicated to the identified client devices 118(1), 118(2) as well as the repository system 104, e.g., over the network 120.

At the second stage 404 of FIG. 4, the client devices 118(1), 118(2) employ respective response generation modules 418(1), 418(2) to generate response data 420(1), 420(2). Likewise, the repository system 104 also includes a response generation module 422 to generate response data 424. Generation of the response data 420(1), 420(2), 424 may be performed using techniques similar to those employed to generate the reports.

For example, an amount specified in the conflict request 412 is determined that specifies a number of bits to be taken from respective key hashes and/or value hashes of respective records maintained locally by the client devices 118(1), 118(2) as well as by the repository system 104. Hash data configuration modules are then employed to generate partial hashes by taking a specified amount of bits from the respective hashes, e.g., a top sixteen bits per record. The hashes, for instance, are taken from respective invertible Bloom lookup tables. The partial hashes are then sorted and compressed using a respective compression module, e.g., as a Golomb-coded sequence. This is included in the response data 420(1), 420(2), 424 communicated to the arbiter system 116 over the network.

The response data 420(1), 420(2), 424 is received by the arbiter system 116 of the data storage system 102 as shown in FIG. 5 responsive to the conflict request 412 (block 616). The conflict is resolved using the response data 420(1), 420(2), 424 (block 618) by a conflict resolution module 502 by merging the responses which is then resolved (e.g., using an XOR operation) to generate a correction 504, 506. The corrections 504, 506 are communicated to the repository system 104 and the search index system 110 to correct the repository data 106 and the search index 112, respectively. The correction 506 may also be communicated to the client devices 118(1), 118(2) to correct data maintained locally by those devices. Additionally, these techniques overcome conventional challenges to reduce network bandwidth, processor use, and memory access with low latency and fast convergence.

In an implementation, the client devices 118(1)-118(N) announce operation to the arbiter system 116 using a lease mechanism. Therefore, during normal operation a message is sent to the arbiter system 116 to end the lease. This allows the arbiter system 116 to determine which client devices 118(1)-118(N) have terminated operation. This allows the arbiter system 116 to detect which client devices have terminated operation that might have caused writes to the data storage system 102 that are not included in the repository system 104. In such an instance, the arbiter system 116 reads the changes received from the client device during this time from the repository system 104 and updates the search index 112 of the search index system 110 accordingly. A variety of other examples are also contemplated.

Example System and Device

Figure 7:
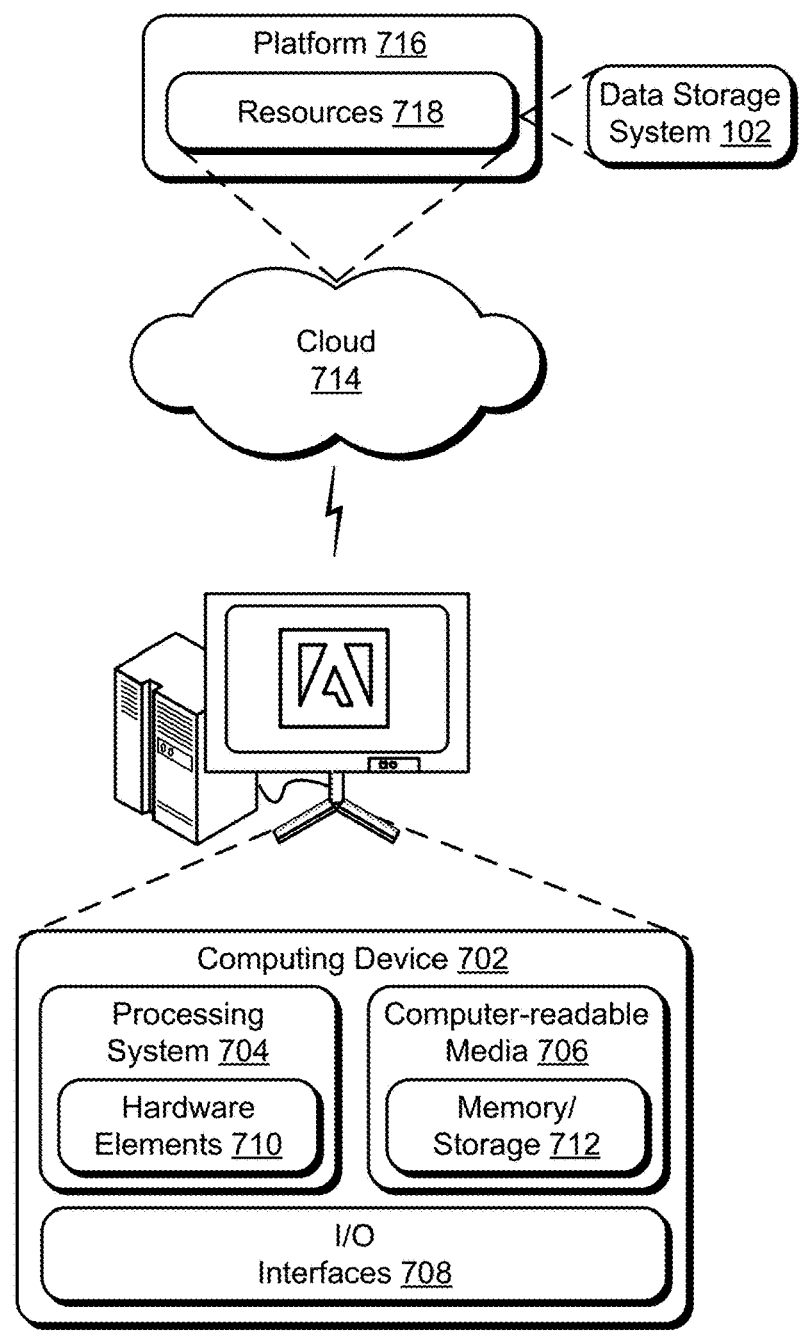
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that implement the various techniques described herein. This is illustrated through inclusion of the data storage system 102. The computing device 702 is configurable, for example, as a server of a service provider system, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that is configurable as processors, functional blocks, and so forth. This includes implementation in hardware as an application specific integrated circuit or other logic device formed using one or more semiconductors. The hardware elements 710 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 706 is illustrated as including memory/storage 712. The memory/storage 712 represents memory/storage capacity associated with one or more computer-readable media. The memory/storage 712 includes volatile media (such as random access memory (RAM)) and/or nonvolatile media (such as read only memory (ROM), Flash memory, optical disks, magnetic disks, and so forth). The memory/storage 712 includes fixed media (e.g., RAM, ROM, a fixed hard drive, and so on) as well as removable media (e.g., Flash memory, a removable hard drive, an optical disc, and so forth). The computer-readable media 706 is configurable in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 702, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 710. The computing device 702 is configured to implement particular instructions and/or functions corresponding to the software and/or hardware modules. Accordingly, implementation of a module that is executable by the computing device 702 as software is achieved at least partially in hardware, e.g., through use of computer-readable storage media and/or hardware elements 710 of the processing system 704. The instructions and/or functions are executable/operable by one or more articles of manufacture (for example, one or more computing devices 702 and/or processing systems 704) to implement techniques, modules, and examples described herein.

The techniques described herein are supported by various configurations of the computing device 702 and are not limited to the specific examples of the techniques described herein. This functionality is also implementable all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 include applications and/or data that can be utilized while computer processing is executed on servers that are remote from the computing device 702. Resources 718 can also include services provided over the Internet and/or through a subscriber network, such as a cellular or Wi-Fi network.

The platform 716 abstracts resources and functions to connect the computing device 702 with other computing devices. The platform 716 also serves to abstract scaling of resources to provide a corresponding level of scale to encountered demand for the resources 718 that are implemented via the platform 716. Accordingly, in an interconnected device embodiment, implementation of functionality described herein is distributable throughout the system 700. For example, the functionality is implementable in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
communicating, by a client device, a report to an arbiter system describing records of changes to data of a repository system that is searchable using a search index of a search index system, the records maintained locally by the client device;
receiving, by the client device, a conflict request from the arbiter system responsive to the communicating of the report, the conflict request generated to request response data to resolve a conflict detected between the data of the repository system and the search index based on comparing the records of changes to data of the repository system described in the report and at least one other report communicated to the arbiter system;
communicating, by the client device, the response data to the arbiter system responsive to the receiving of the conflict request;
receiving, by the client device, a correction from the arbiter system, the correction generated based on the response data communicated by the client device and response data communicated to the arbiter system by the repository system; and
resolving, by the client device, the conflict based on the correction received from the arbiter system to correct data maintained locally at the client device.

2. The method as described in claim 1, wherein the at least one other report communicated to the arbiter system is by the repository system.

3. The method as described in claim 1, wherein the at least one other report communicated to the arbiter system is by another client device.

4. The method as described in claim 1, wherein the report and the at least one other report communicated to the arbiter system include at least a portion of a hash of a key and a portion of a hash of a corresponding value of a respective said record.

5. The method as described in claim 4, wherein the portion of the hash of the key or the portion of the hash of the corresponding value of the respective said record is specified in a report request received by the client device from the arbiter system.

6. The method as described in claim 1, wherein the report and the at least one other report describe changes initiated to both the data of the repository system and the search index of the search index system.

7. The method as described in claim 1, wherein the conflict request specifies a number of records to be obtained describing changes to the data involved in the conflict and an amount of data to be included, respectively, in a hash of the number of records.

8. The method as described in claim 7, wherein the amount of data to be included, respectively, in the hash of the number of records is based on criteria including a number of active said client devices, heuristic data describing past conflicts, or a probability of encountering the conflict.

9. The method as described in claim 7, wherein the amount of data to be included specifies a portion of a hash of a key and a portion of a hash of a corresponding value of a respective said record.

10. The method as described in claim 1, wherein the correction is generated using an XOR operation based on response data received from the repository system and the response data received from the client device.

11. A computing device comprising:
a processing device; and
a computer-readable storage medium implementing a repository system and storing instructions that, responsive to execution by the processing device, causes the processing device to perform operations including:
maintaining data by the repository system that is received from a plurality of client devices and searchable using a search index of a search index system;
receiving a conflict request from an arbiter system, the conflict request generated to request response data to resolve a conflict detected between the data of the repository system and the search index based on comparing records of changes to the data of the repository system described in reports received by the arbiter system from the plurality of client devices;
communicating the response data to the arbiter system responsive to the receiving of the conflict request;
receiving a correction from the arbiter system, the correction generated based on the response data communicated by the repository system and response data communicated to the arbiter system by at least one of the plurality of client devices; and
resolving the conflict based on the correction received from the arbiter system to correct the data in the repository system.

12. The computing device as described in claim 11, wherein the comparing of the records is performed based on a plurality of reports received by the arbiter system from the plurality of client devices.

13. The computing device as described in claim 12, wherein the plurality of reports includes at least a portion of a hash of a key and a portion of a hash of a corresponding value of a respective said record.

14. The computing device as described in claim 13, wherein the portion of the hash of the key or the portion of the hash of the corresponding value of the respective said record is specified in a report request received by a respective said client device.

15. The computing device as described in claim 12, wherein the plurality of reports describes changes initiated to both the data of the repository system and the search index system.

16. The computing device as described in claim 11, wherein the conflict request specifies a number of records to be obtained describing changes to the data involved in the conflict and an amount of data to be included, respectively, in a hash of the number of records.

17. The computing device as described in claim 16, wherein the amount of data to be included, respectively, in the hash of the number of records is based on criteria including a number of active said client devices, heuristic data describing past conflicts, or a probability of encountering the conflict.

18. The computing device as described in claim 16, wherein the amount of data to be included specifies a portion of a hash of a key and a portion of a hash of a corresponding value of a respective said record.

19. A data storage system comprising:
a repository system configured to maintain data received from a plurality of client devices;
a search index system configured to maintain a search index supporting a search of the data in the repository system; and
an arbiter system configured to:
detect a conflict between the data of the repository system and the search index by comparing records of changes to the data of the repository system described in a plurality of reports, one to another, received from the plurality of client devices;
generate a conflict request for transmission to the repository system and a client device of the plurality of client devices to request response data to resolve in the conflict;
generate a correction to the data of the repository system and the search index based on the response data received from the repository system and the client device responsive to the conflict request; and
resolve the conflict by communicating the correction to the repository system and the search index system to be used, respectively, to correct the data of the repository system and the search index of the search index system.

20. The data storage system as described in claim 19, where the comparing of the records is performed based further on records of changes to the data of the repository system described in at least one other report communicated by the repository system.

* * * * *